(12) United States Patent
Itoga

(10) Patent No.: US 7,866,690 B2
(45) Date of Patent: Jan. 11, 2011

(54) AIR BELT APPARATUS

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 278 days.

(21) Appl. No.: 11/992,413

(22) PCT Filed: Nov. 8, 2006

(86) PCT No.: PCT/JP2006/322263

§ 371 (c)(1),
(2), (4) Date: Mar. 21, 2008

(87) PCT Pub. No.: WO2007/058098

PCT Pub. Date: May 24, 2007

(65) Prior Publication Data

US 2009/0108570 A1  Apr. 30, 2009

(30) Foreign Application Priority Data

Nov. 15, 2005  (JP) ............................. 2005-330419

(51) Int. Cl.
*B60R 21/18* (2006.01)
(52) U.S. Cl. ...................... 280/733; 280/736
(58) Field of Classification Search ................ 280/733, 280/736, 742
See application file for complete search history.

(56) References Cited

U.S. PATENT DOCUMENTS

| | | | | |
|---|---|---|---|---|
| 3,801,156 A * | 4/1974 | Granig | .......................... | 280/733 |
| 5,062,662 A * | 11/1991 | Cameron | ...................... | 280/733 |
| 5,466,003 A * | 11/1995 | Tanaka et al. | ................ | 280/733 |
| 6,062,597 A * | 5/2000 | Suyama | ........................ | 280/733 |
| 6,109,647 A * | 8/2000 | Akaba et al. | ................. | 280/733 |
| 6,168,195 B1 * | 1/2001 | Okazaki et al. | .............. | 280/733 |
| 6,170,863 B1 * | 1/2001 | Takeuchi et al. | ............. | 280/733 |
| RE37,280 E * | 7/2001 | Tanaka et al. | ................ | 280/733 |
| 6,276,715 B1 * | 8/2001 | Takeuchi | ...................... | 280/733 |
| 6,336,657 B1 * | 1/2002 | Akaba et al. | ................. | 280/733 |
| 6,340,173 B1 * | 1/2002 | Specht | ........................ | 280/733 |
| 6,419,264 B1 * | 7/2002 | Tsuji et al. | ................... | 280/733 |
| 6,471,243 B1 * | 10/2002 | Brown | ......................... | 280/733 |
| 6,523,873 B1 | 2/2003 | Summe et al. | | |
| 6,811,184 B2 | 11/2004 | Ikeda et al. | | |
| 6,863,298 B2 | 3/2005 | Sakai et al. | | |
| 2005/0134022 A1 | 6/2005 | Nogushi et al. | | |
| 2005/0184491 A1 * | 8/2005 | Itoga | ........................ | 280/730.1 |
| 2005/0189749 A1 | 9/2005 | Itoga et al. | | |

FOREIGN PATENT DOCUMENTS

JP    11-165605    6/1999

(Continued)

*Primary Examiner*—Paul N Dickson
*Assistant Examiner*—Karen Jane J Amores
(74) *Attorney, Agent, or Firm*—Foley & Lardner LLP

(57) ABSTRACT

An air belt apparatus that can reduce the required tolerance level of a pipe is provided. Gas supplied from an inflator 12 flows into a bag body 16 through a pipe 18 so as to inflate a lap bag 15. The inflator 12 is connected to a gas inlet 16*a* of the bag body 16 via the pipe 18. The gas inlet 16*a* is cylindrical, and the pipe 18 is inserted in this cylindrical gas inlet 16*a* so as to extend beyond an inner end of the gas inlet 16*a*.

6 Claims, 4 Drawing Sheets

FOREIGN PATENT DOCUMENTS

| | | |
|---|---|---|
| JP | 2001-210423 | 8/2001 |
| JP | 2003-146174 | 5/2003 |
| JP | 2003-160010 | 6/2003 |
| JP | 2004-17686 | 1/2004 |
| JP | 2005-178612 | 7/2005 |
| JP | 2005-239055 | 9/2005 |

* cited by examiner

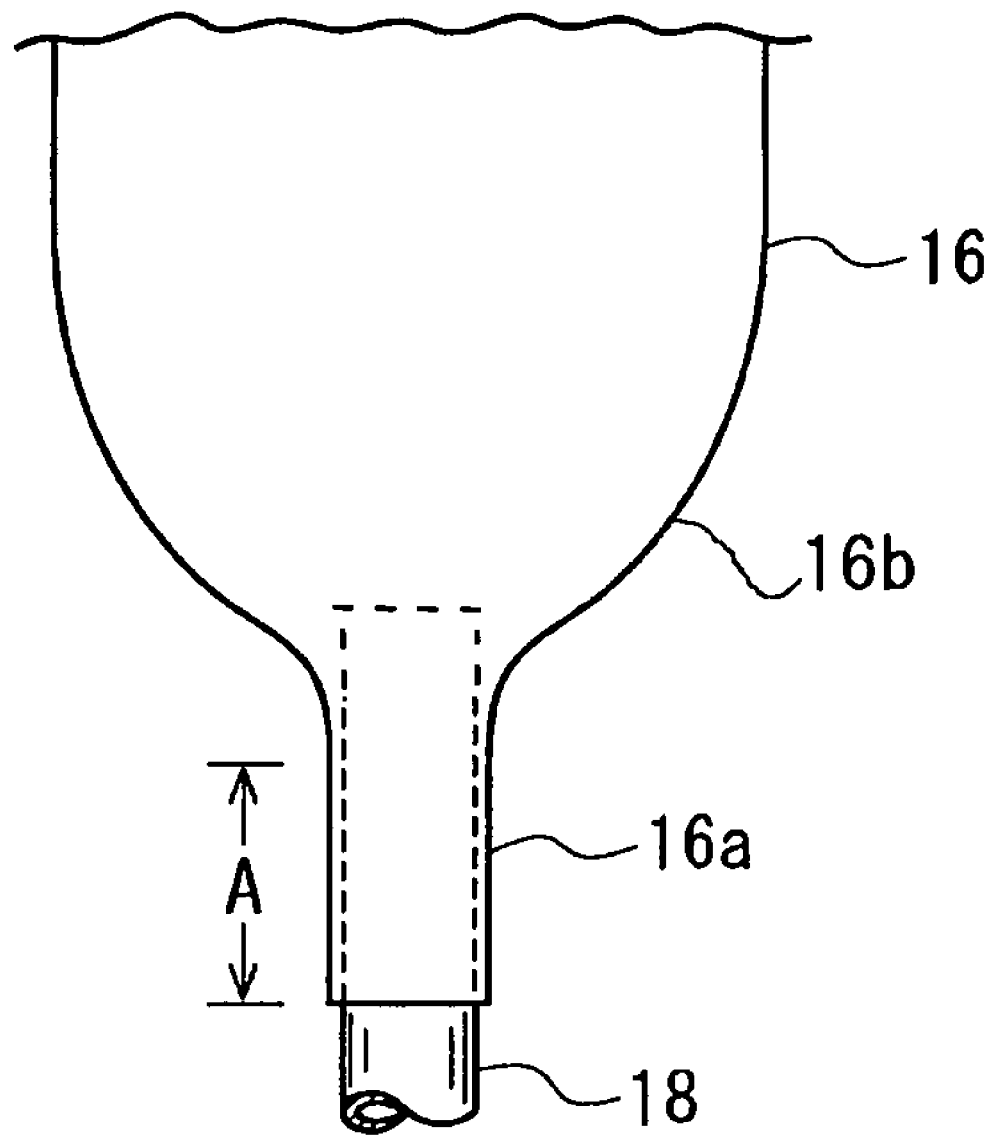

AIR BELT APPARATUS

TECHNICAL FIELD

The present invention relates to an air belt apparatus for restraining an occupant seated in a seat of a vehicle, such as an automobile, in the event of a collision.

BACKGROUND ART

In an air belt apparatus, at least one of a shoulder belt and a lap belt is inflatable by means of gas supplied from an inflator.

FIGS. 3 and 4 in Japanese Unexamined Patent Application Publication No. 11-165605 show an air belt apparatus having an inflator disposed within a center pillar and an inflatable shoulder belt connected to a shoulder anchor that has the form of a rectangular pipe and serves also as a gas passage. The shoulder belt includes a bag and a cover. The rectangular-pipe shoulder anchor is inserted and secured to a gas inlet of the bag. The cover is also secured to the shoulder anchor.

Patent Document 1: Japanese Unexamined Patent Application Publication No. 11-165605

In the case where the pipe is inserted and secured to the gas inlet of the bag as in Japanese Unexamined Patent Application Publication No. 11-165605, an area of the bag around the tip end of the pipe needs to have tolerance to high temperature gas since this area of the bag directly receives high temperature gas discharged from the tip end of the pipe.

SUMMARY OF THE INVENTION

An object of the present invention is to provide an air belt apparatus that reduces the level of tolerance required by the bag.

An air belt apparatus according to the present invention is directed to an air belt apparatus in which gas from an inflator is supplied to a bag via a pipe. The bag includes a gas inlet through which the pipe extends. The pipe extends beyond an inner end of the gas inlet.

The gas inlet may have a cylindrical shape with a uniform diameter.

The gas inlet may have a tapered shape whose diameter becomes smaller toward the inner end thereof.

BRIEF DESCRIPTION OF THE DRAWINGS

FIG. 3 illustrates a relationship between a lap bag and a pipe.

DETAILED DESCRIPTION

In an air belt apparatus according to the present invention, a pipe is inserted in a gas inlet to extend beyond an inner end of the gas inlet. Since the portion adjoining the inner end of the gas inlet has a large inflation diameter, the severity of gas discharged from the pipe is alleviated. Accordingly, this reduces the required tolerance level of a bag to high-temperature gas.

In a case where the gas inlet has a cylindrical shape with a uniform diameter, the pipe extends beyond the inner end of the cylindrical portion.

In a case where the gas inlet has a tapered shape whose diameter becomes smaller from its entrance end toward its inner end, the pipe extends beyond the inner end of a narrow portion of the tapered gas inlet, which is where the gas inlet is at its smallest diameter.

Embodiments according to the present invention will be described below with reference to the drawings.

Figure 1A:
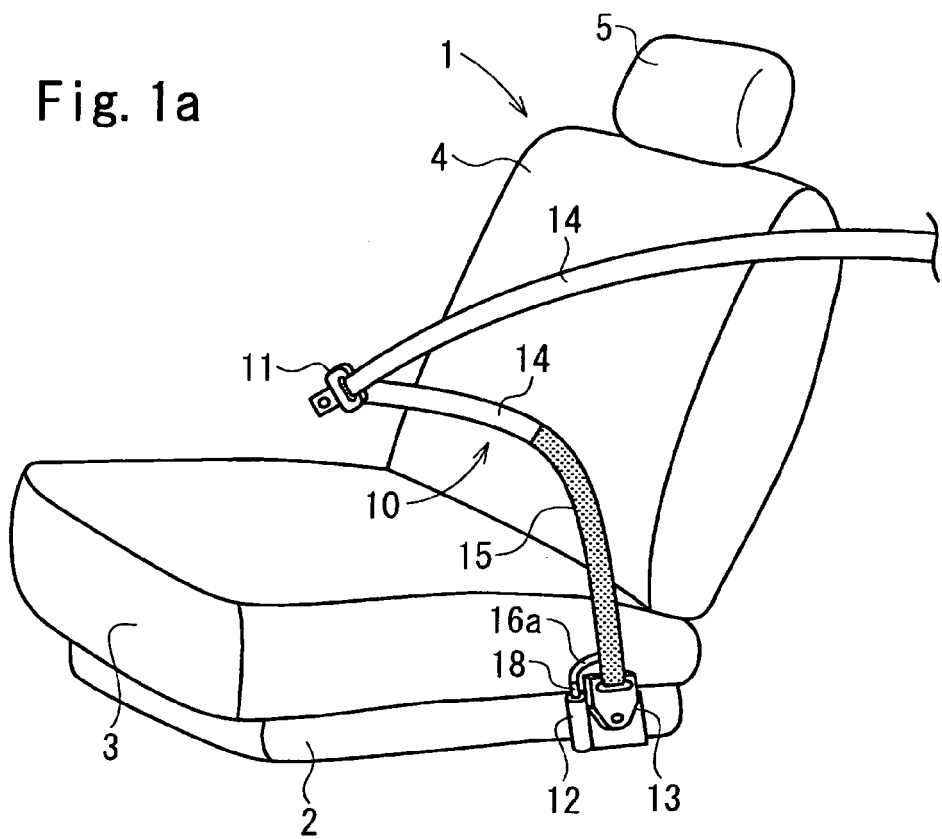
FIGS. 1a and 1b are perspective views of a seat equipped with an air belt apparatus according to an embodiment.
Figure 1B:
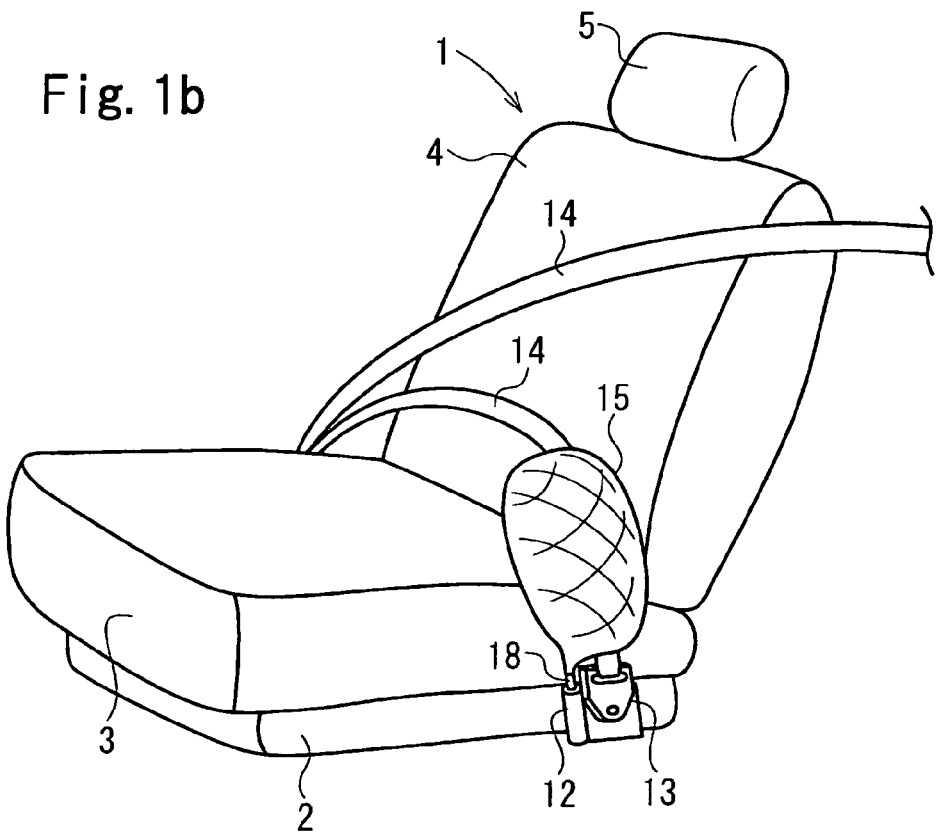
Figure 2A:
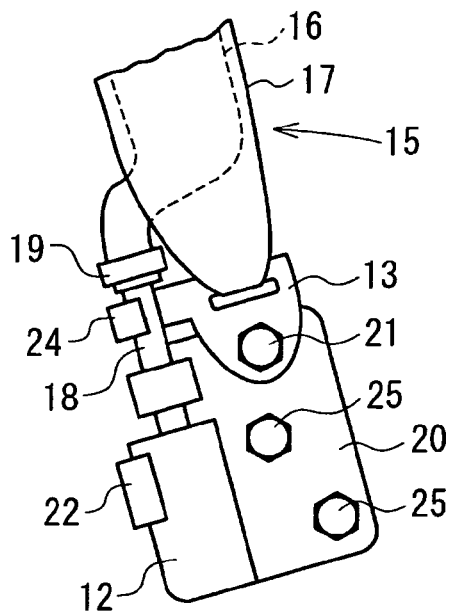
FIGS. 2a and 2b illustrate an anchor portion of an air belt.
Figure 2B:
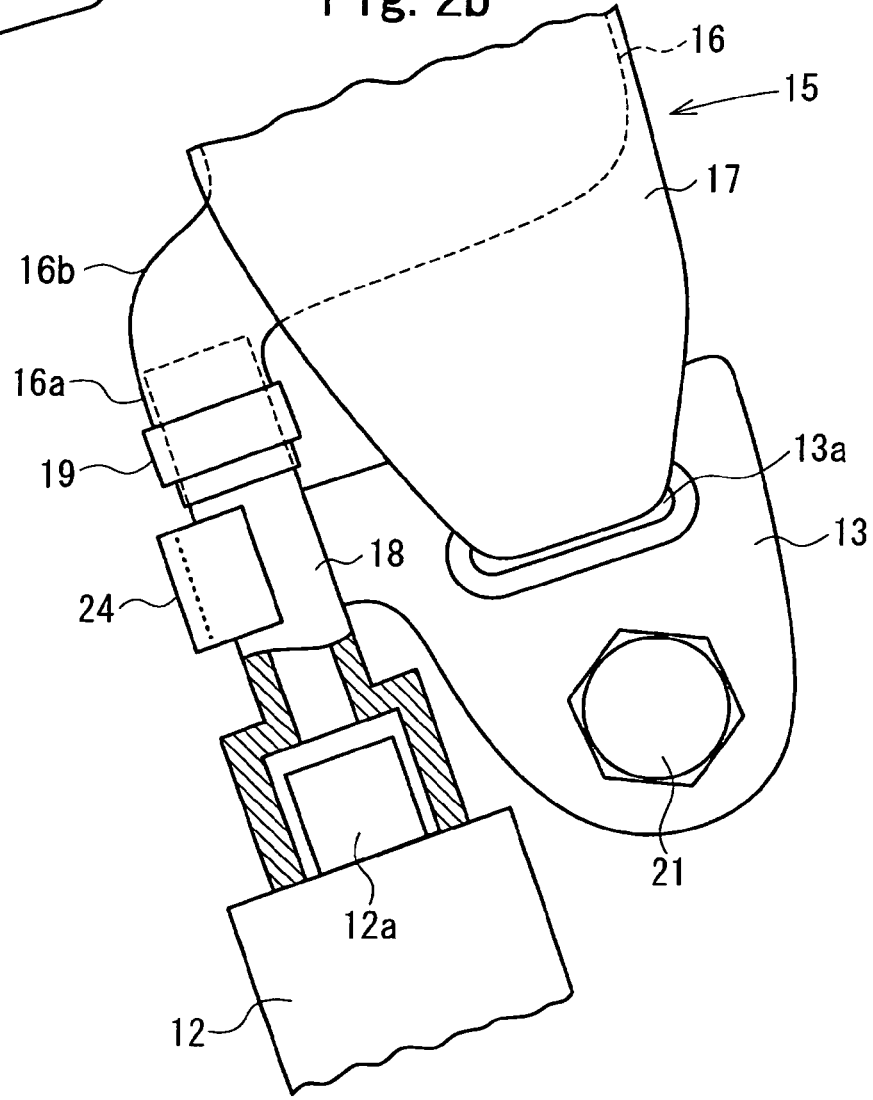

FIGS. 1a and 1b are perspective views of a seat equipped with an occupant restraining apparatus according to an embodiment. FIG. 1b shows a state where an air belt is inflated. FIG. 2a is a front view of an anchor portion. FIG. 2b is an enlarged view of a portion shown in FIG. 2a. FIG. 3 illustrates a relationship between a bag and a pipe.

A seat 1 of an automobile includes a seat frame 2, a seat cushion 3 disposed on the seat frame 2, a seat back 4 extending upward in a reclinable fashion from a rear portion of the seat cushion 3, and a headrest 5 attached to an upper portion of the seat back 4. One side surface of the seat frame 2, that is, the side surface proximate to the center of the vehicle cabin, is provided with a buckle device (not shown). A tongue 11 of an air belt 10, which is included in the occupant restraining apparatus and is extendable along the front side of the body of an occupant seated in the seat 1, is detachably connected to this buckle device. The other side surface of the seat frame 2, that is, the side surface proximate to a side surface (such as a door) of the vehicle cabin, is provided with an inflator 12 and a lap anchor 13.

The air belt 10 has a webbing 14 hooked through the tongue 11 and a lap bag 15 connected to one end of the webbing 14. The other end of the webbing 14 is hooked through a shoulder anchor (not shown) provided on a B pillar and is retractably connected to a seatbelt retractor (not shown).

The lap bag 15 includes a bag body 16 and a tubular cover 17 that covers the bag body 16. Normally, the bag body 16 is folded in a flat and elongated shape. When the bag body 16 is in a non-inflated state, the cover 17 has a size that fits around the outer periphery of the folded bag body 16, but when the bag body 16 is inflated, the cover 17 expands in the circumferential direction thereof to permit the inflation of the bag body 16.

One end of the cover 17 is connected to the webbing 14 by, for example, stitching. The other end of the cover 17 extends through an opening 13a provided in the lap anchor 13 so as to be connected to the lap anchor 13.

In this embodiment, the cover 17 is formed of a knit fabric that is expandable in the circumferential direction but is substantially non-expandable in the longitudinal direction. Therefore, when the bag body 16 is inflated, the meshes of the cover 17 expand in the circumferential direction with the stretching of the cover 17 in the circumferential direction. As a result, the cover 17 becomes shorter in the longitudinal direction. This causes the webbing 14 to become tighter, whereby the webbing 14 becomes in close contact with the occupant's body.

The inflator 12 is connected to a gas inlet 16a of the bag body 16 via a pipe 18. The gas inlet 16a is cylindrical and has length A from an entrance end thereof. An inner end of the gas inlet 16a adjoins a large-diameter portion 16b that has a diameter larger than that of the gas inlet 16a. The pipe 18 is inserted into the cylindrical gas inlet 16a so as to extend to the large-diameter portion 16b that adjoins the inner end of the cylindrical gas inlet 16a. In other words, the tip end of the pipe 18 is disposed in the large-diameter portion 16b.

After the pipe 18 is inserted into the gas inlet 16a, the pipe 18 and the gas inlet 16a are securely coupled to each other by tightening the gas inlet 16a with a lashing member 19 such as a crimp band.

An end of the cover 17 is connected to the lap anchor 13. The lap anchor 13 is fixed to a base plate 20 with fixing means such as a bolt 21.

The inflator 12 is attached to the base plate 20 by means of a hook portion 22 provided on the base plate 20. The lap anchor 13 is provided with a hook portion 24 which supports the pipe 18. An upper end of the pipe 18 is connected to the bag body 16, and a lower end thereof is engaged with a gas outlet 12a of the inflator 12.

The base plate 20 is fixed to the seat frame 2 with fixing means such as bolts 25.

Operation of the air belt apparatus will be described below.

When an automobile collision is detected, the inflator 12 is activated to discharge gas. The gas from the inflator 12 flows into the bag body 16 through the pipe 18 so as to inflate the lap bag 15. As a result, the waist portion of an occupant is restrained. In the event of a collision, the inflated lap bag 15 intervenes a sidewall of the vehicle cabin (such as a door) and the occupant to ensure that the waist portion of the occupant is prevented from moving towards the sidewall of the vehicle cabin. The lap bag 15 can also serve as a buffer in a case where the sidewall of the vehicle cabin protrudes inward toward the occupant. Furthermore, when the lap bag 15 is shortened in length as a result of inflation, pre-tension is generated on the lap portion, thereby restraining the occupant.

In this embodiment, the pipe 18 extends beyond the inner end of the gas inlet 16a. This alleviates the severity of gas discharged from the pipe 18 directly hitting the inner surface of the bag body 16. In other words, if the tip end of the pipe 18 is positioned within the gas inlet 16a, the high-temperature gas just released from the pipe 18 will directly hit the inner periphery surface of the gas inlet 16a. In particular, if the gas inlet 16a is bent or twisted, the gas will be directly blown against the inner surface of the gas inlet 16a. In contrast, in the present embodiment, the tip end of the pipe 18 extends to the large-diameter portion 16b adjoining the inner end of the gas inlet 16a so that the gas inlet 16a is prevented from becoming bent or twisted. In addition, due to a sufficient distance between the tip end of the pipe 18 and the inner surface of the bag body 16, heat load applied to the bag body 16 is reduced. Accordingly, the required tolerance level of the bag body 16 to gas discharged by the inflator is reduced.

Figure 4:
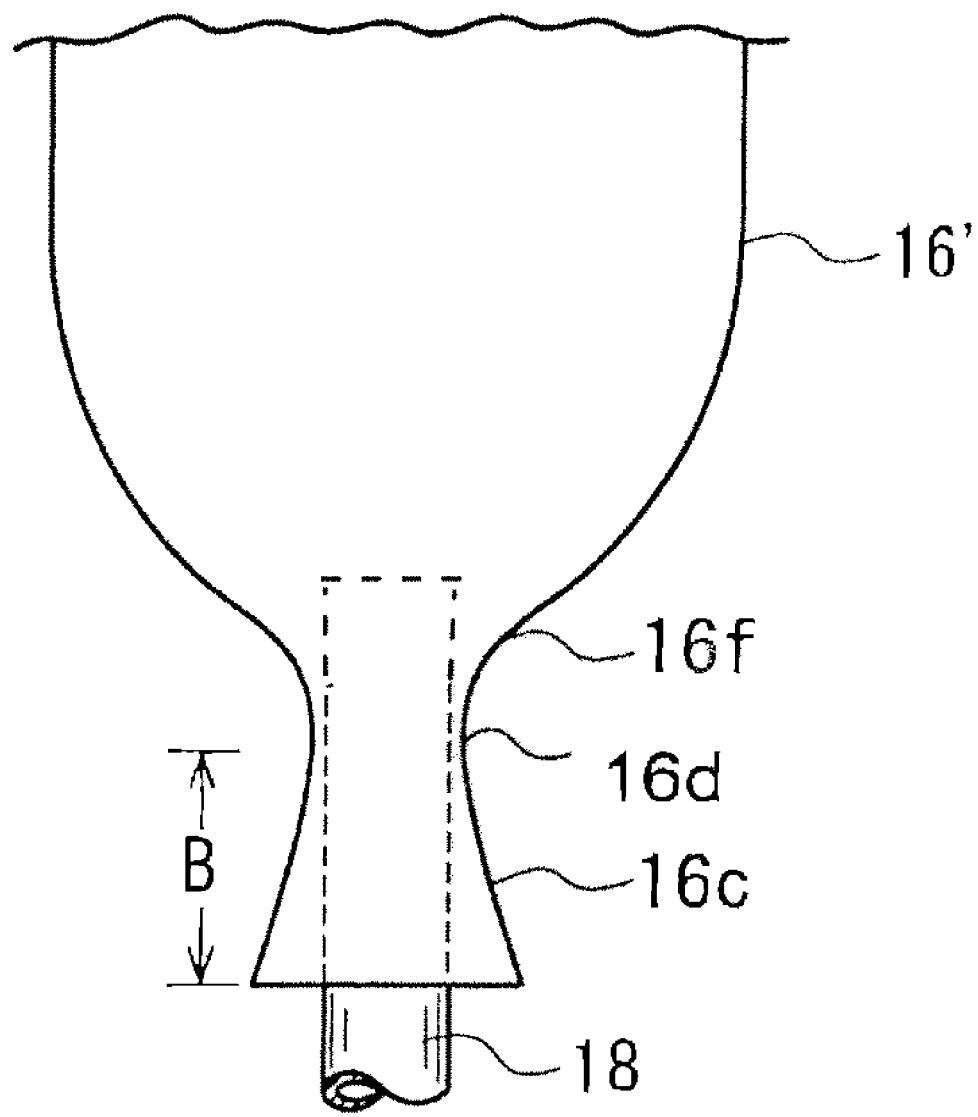
FIG. 4 illustrates a relationship between a lap bag and a pipe.

Although the gas inlet 16a of the bag body 16 in FIG. 3 has a cylindrical shape when inflated, the gas inlet may alternatively be tapered such that the diameter thereof becomes smaller toward the inner end, as shown by a gas inlet 16c of a bag body 16' in FIG. 4. In this embodiment, the tapered gas inlet 16c has length B from an entrance end thereof. The pipe 18 inserted in the gas inlet 16c extends beyond an inner end of a narrow portion 16d, which is where the gas inlet 16c is at its smallest diameter. In other words, the tip end of the pipe 18 extends beyond the inner end of the narrow portion 16d so as to be positioned in a large-diameter portion 16f having a diameter larger than that of the narrow portion 16d. With this bag body 161, a sufficient distance is maintained between the tip end of the pipe 18 and the inner surface of the bag body 16', whereby the required tolerance level of the bag body 16' to gas discharged by the inflator is reduced.

Although the entire gas inlet 16c is tapered in FIG. 4, it may partially be cylindrical.

The cross-sectional area of the inflated bag body 16 or 16' where the tip end of the pipe 18 is positioned is more than or equal to 1.5 times that of the opening of the tip end of the pipe 18. For example, 1.5 to 6 times is preferable.

The above embodiments are examples of the present invention, and therefore, the present invention is not limited to the above embodiments.

This application is based on Japanese Patent Application (No. 2005-330419) filed on Nov. 15, 2005, the entire contents of which are incorporated herein by reference.

The invention claimed is:

1. An air belt apparatus, comprising:
   an inflatable lap belt bag;
   an inflator to inflate the lap belt bag; and
   a lap anchor; and
   a base plate,
   wherein gas from the inflator is supplied to the bag via a pipe, wherein the bag includes a gas inlet through which the pipe extends and a large-diameter portion adjoining an inner end of the gas inlet and having a diameter larger than that of the gas inlet,
   wherein the pipe extends beyond the inner end of the gas inlet,
   wherein a tip end of the pipe is positioned in the large-diameter portion, and
   wherein the inflator is attached to the base plate via a hook portion on the base plate, and the lap anchor is fixed to the base plate, and wherein the base plate includes a second hook portion to connect the base plate to the pipe.

2. The air belt apparatus according to claim 1, wherein the gas inlet has a cylindrical shape with a uniform diameter.

3. The air belt apparatus according to claim 1, wherein the gas inlet has a tapered shape whose diameter becomes smaller toward the inner end.

4. The air belt apparatus according to claim 3, wherein the bag includes a narrow portion corresponding to where the diameter of the gas inlet is the smallest, and wherein the large-diameter portion has a diameter larger than that of the narrow portion.

5. The air belt apparatus according to claim 1, wherein the gas inlet is coupled to the pipe by tightening the gas inlet with a lashing member.

6. The air belt apparatus according to claim 1, wherein a cross-sectional area of an inflated bag body where a tip end of the pipe is positioned is 1.5 to 6 times that of an opening of the tip end of the pipe.

\* \* \* \* \*